United States Patent
Brown et al.

(10) Patent No.: US 7,861,595 B2
(45) Date of Patent: Jan. 4, 2011

(54) PRESSURE SENSING DEVICE FOR HARSH ENVIRONMENTS

(75) Inventors: Gregory C. Brown, Chanhassen, MN (US); Thomas A. Larson, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 95 days.

(21) Appl. No.: 12/463,504

(22) Filed: May 11, 2009

(65) Prior Publication Data

US 2010/0281994 A1    Nov. 11, 2010

(51) Int. Cl.
G01L 7/00 (2006.01)
(52) U.S. Cl. ........................................................ 73/706
(58) Field of Classification Search ........................ None
See application file for complete search history.

(56) References Cited

U.S. PATENT DOCUMENTS

| | | | |
|---|---|---|---|
| 5,285,690 A | 2/1994 | Koen et al. | |
| 5,471,884 A | 12/1995 | Czarnocki et al. | |
| 5,974,893 A * | 11/1999 | Balcarek et al. | 73/714 |
| 6,109,113 A | 8/2000 | Chavan et al. | |
| 6,453,747 B1 * | 9/2002 | Weise et al. | 73/715 |
| 6,782,755 B2 | 8/2004 | Tai et al. | |
| 6,845,664 B1 | 1/2005 | Okojie | |
| 7,124,639 B1 | 10/2006 | Kurtz et al. | |
| 7,538,401 B2 * | 5/2009 | Eriksen et al. | 257/419 |
| 2005/0120798 A1 * | 6/2005 | James | 73/715 |
| 2005/0204823 A1 * | 9/2005 | Murai | 73/724 |
| 2006/0107750 A1 * | 5/2006 | Tanaka et al. | 73/754 |
| 2007/0107524 A1 | 5/2007 | O'Brien et al. | |
| 2007/0261497 A1 | 11/2007 | O'Brien et al. | |
| 2008/0210013 A1 | 9/2008 | Meehan et al. | |

OTHER PUBLICATIONS

Okojie, Robert S. et al., "Characteristics of a Hermetic 6H-SIC Pressure Sensor at 600 C", "AIAA Space 2001 Conference and Exposition", Aug. 28-30, 2001, pp. 1-8, Publisher: AIAA, Published in: Albuquerque, NM.

Sippola, Clayton B., "A Ceramic Capacitive Pressure Microsensor with Screen-Printed Diaphragm", "Dissertation", Apr. 24, 2006, Publisher: Division of Research and Advanced Studies of the University of Cincinnati.

* cited by examiner

Primary Examiner—Andre J Allen
(74) Attorney, Agent, or Firm—Fogg & Powers LLC

(57) ABSTRACT

A pressure sensing device comprises a substrate having an opening, a pressure sensor die electrically connected to the substrate, and a pedestal having an upper surface that extends through the opening in the substrate, with the upper surface affixed to the sensor die. The pedestal has a pressure port that extends from the upper surface to a bottom surface of the pedestal, with the pressure port containing a hermetic sealing tube therein. A hermetic sealing cover is affixed to the substrate over the sensor die, with the cover and the substrate containing a reference pressure for the sensor die. A media isolation component has a chamber filled with a fluid that transmits a pressure applied to the media isolation component to the pressure sensor die. A capillary tube is affixed within the pressure port of the pedestal and is in communication with the sealing tube. The capillary tube and the sealing tube provide fluid communication between the chamber of the media isolation component and the sensor die.

20 Claims, 3 Drawing Sheets

PRESSURE SENSING DEVICE FOR HARSH ENVIRONMENTS

BACKGROUND

Pressure sensors are used in a variety of harsh environments. For example, in oil drilling operations, it is desirable to obtain pressure measurements at the bottom of the well hole being drilled. This requires pressure sensors capable of withstanding the extreme heat (greater than 225° C.) and pressure (greater 20 KSI) found at the bottom of these well holes, which can be over five miles deep.

In addition to withstanding harsh environments, these pressure sensors are required to provide highly accurate pressure measurements and operate over long periods of time with minimal drift. Such pressure sensors also need a small diameter footprint in that multiple sensors are needed in the tools used in down hole applications, for example. These pressure sensors also need long life and ruggedness because a failed sensor is very difficult to access if replacement is necessary, such as in down hole operations.

In conventional approaches, the pressure sensor devices employed typically fail to meet one or more of the foregoing requirements. For example, pressure sensors formed in silicon dies are typically mounted to glass pedestals using thermoelectric bonding technology. For high pressure, high temperature sensor devices using this configuration, the glass mechanical properties are not adequate to allow the stability and performance required of these devices.

Accordingly, there is a need for improved pressure sensors that operate successfully and have a long life under harsh environmental conditions.

SUMMARY

The present invention relates to a pressure sensing device for harsh environments. The pressure sensing device comprises a substrate having an opening, a pressure sensor die electrically connected to the substrate, and a pedestal having an upper surface that extends through the opening in the substrate. The upper surface of the pedestal is affixed to the pressure sensor die, with the pedestal having a pressure port that extends from the upper surface to a bottom surface of the pedestal, the pressure port containing a hermetic sealing tube therein. A hermetic sealing cover is affixed to the substrate over the pressure sensor die, with the hermetic sealing cover and the substrate configured to contain a reference pressure for the pressure sensor die. A media isolation component has a chamber filled with a fluid that transmits a pressure applied to the media isolation component to the pressure sensor die. A pressure connector capillary tube is affixed within the pressure port and is in communication with the sealing tube. The capillary tube and the sealing tube provide fluid communication between the chamber of the media isolation component and the pressure sensor die. The substrate has electrical connections outside of the reference pressure that electrically connect to the pressure sensor die. In one implementation, the pressure sensing device can be secured within a high pressure fitting.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1A:
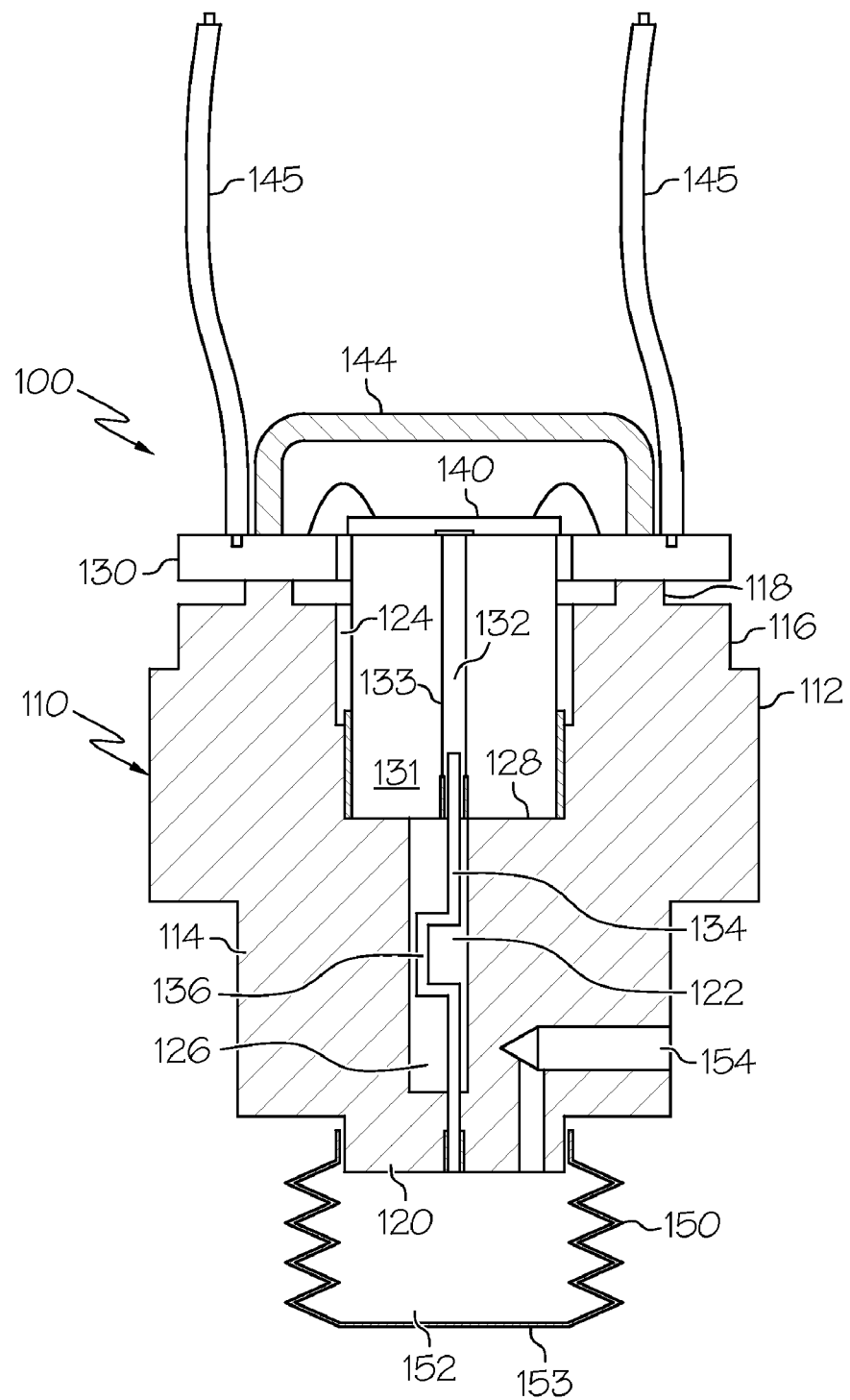
FIG. 1A illustrates a cross-sectional side view of a pressure sensing device according to one embodiment.

In the following detailed description, embodiments are described in sufficient detail to enable those skilled in the art to practice the invention. It is to be understood that other embodiments may be utilized without departing from the scope of the present invention. The following detailed description is, therefore, not to be taken as limiting.

The present invention is directed to a pressure sensing device configured to operate in harsh environments, such as high temperature and high pressure environments. The pressure sensing device generally includes a substrate such as a multilayer ceramic substrate, a pressure sensor die electrically connected to the substrate, and a pedestal such as a silicon pedestal having an upper surface that extends through an opening in the substrate. The upper surface of the pedestal is affixed to the pressure sensor die, with the pedestal having a pressure port with a hermetic sealing tube therein.

A hermetic sealing cover is affixed to the substrate over the pressure sensor die. The cover and the substrate are configured to contain a reference pressure for the pressure sensor die. The reference pressure is typically less than atmospheric pressure, and can be a near vacuum created with an inert gas such as nitrogen or argon.

A media isolation component has a chamber filled with a fluid that transmits a pressure applied to the media isolation component to the pressure sensor die. A pressure connector capillary tube is affixed within the pressure port and is in communication with the sealing tube. The capillary tube and the sealing tube provide fluid communication between the chamber of the media isolation component and the pressure sensor die.

The present pressure sensing device is particularly useful in equipment for down hole drilling applications, where temperatures and pressures are extremely high. The pressure sensing device may also be used in aerospace applications such as in Full Authority Digital Engine Control (FADEC) for jet aircraft engines, missile applications, and supersonic aircraft. The pressure sensing device may also be used in geothermal applications, and in flow sensors for various processing systems.

The pressure sensing device provides several benefits. First, the pressure sensing device eliminates the traditional header that relies on glass-to-metal seals between the header and electrical connection pins. The header is replaced with a low cost multilayer substrate capable of providing a hermetic seal around the reference side of the sensor.

Another benefit is using the pedestal having a small diameter pressure port with a hermetic sealing tube therein. The pedestal also provides stress isolation for the pressure sensor die. By keeping the pressure port diameter small, the loading on support structures is minimized. This reduced load on the support structures allows for a much reduced wall thickness and weld penetrations, which results in a much smaller overall pressure sensing device.

A further benefit is that the substrate can be fabricated such that an integrated circuit die can be mounted in the same reference pressure as the sensor die. This allows optimal pressure sensor signal conditioning in a low noise, closely connected environment. In addition, both temperature and pressure outputs can be provided in the pressure sensing device. For example, temperature sensitive resistors can be employed to compensate for temperature effects along with an operational amplifier, which can be mounted adjacent to the sensor die under the cover.

Further details of the pressure sensing device are set forth hereafter with reference to the drawings.

FIG. 1A illustrate a pressure sensing device 100 according to one embodiment. The pressure sensing device 100 is constructed to measure pressures in high temperature and high pressure environments.

The pressure sensing device 100 includes a support structure 110 having an upper section 112 with a first outer diameter, and a lower section 114 with a second outer diameter smaller that the first outer diameter. The upper section 112 has a narrower top portion 116 with an outer support ring 118. The lower section 114 has a bottom flange 120. The support structure can be composed of a high performance alloy, such as a nickel-chromium (Ni—Cr) alloy (e.g., an Inconel alloy).

The support structure 110 has a channel 122 of varying diameter along its longitudinal center-line from support ring 118 to bottom flange 120. The channel 122 has an upper channel portion 124 that extends partially through upper section 112. The channel 122 also has a lower channel portion 126 that is contiguous with upper channel portion 124 and extends through lower section 114. The upper channel portion 124 has a channel diameter that is larger than a channel diameter of lower channel portion 126, resulting in a channel shelf 128 where the upper and lower channel portions meet.

A circular substrate 130 with an opening therethrough is attached to support ring 118 such as by brazing with a metal or alloy. The substrate 130 can be fabricated from a material capable of withstanding high temperatures, having interlayer electrical connects, and providing reference pressure integrity for an indefinite length of time. In one embodiment, the substrate material is a ceramic such as a low temperature co-fired ceramic (LTCC). Such a ceramic substrate is multi-layered, with metalized electrical connection traces provided on each layer as required. The metallization process is compatible with vacuum integrity requirements. Each of the layers are processed in parallel and only brought together in an accurately aligned stack immediately prior to firing of the ceramic.

A die support pedestal 131, which can be composed of silicon or a ceramic, has a small diameter pressure port 132 along its longitudinal center-line. The pressure port 132 contains a hermetic sealing tube 133 made from a low expansion, high strength alloy such as Kovar (UNS K94610) or equivalent. The pedestal 131 is inserted into upper channel portion 124 and abuts against shelf 128. The pedestal 131 can be secured within upper channel portion 124 against shelf 128 by brazing (hard mounted) with a metal or alloy, or by an epoxy (soft mounted) such as a high temperature elastomeric compound like silicon rubber.

A pressure connector capillary tube 134 is partially inserted into the pressure port of pedestal 131 and secured therein such as by brazing or welding. In one embodiment, a high-temperature silicon-gold (Si—Au) braze is used in a forming atmosphere to secure capillary tube 134 in the pedestal hole. The capillary tube 134 can be made of a low-expansion high-strength metal material such as a nickel-cobalt ferrous (Ni—Co—Fe) alloy (e.g., a Kovar alloy). The capillary tube 134 extends from pedestal 131 through lower channel portion 126 and to the end of bottom flange 120.

The capillary tube 134 has a strain-relief section 136 incorporated into its geometry that can be shaped in various configurations (e.g., C-shaped, corkscrew) when pedestal 131 is hard mounted. The strain-relief section 136 allows for accommodating changes in strain due to temperature changes. The strain-relief feature of tube 134 is not required when pedestal 131 is soft mounted.

Figure 1B:
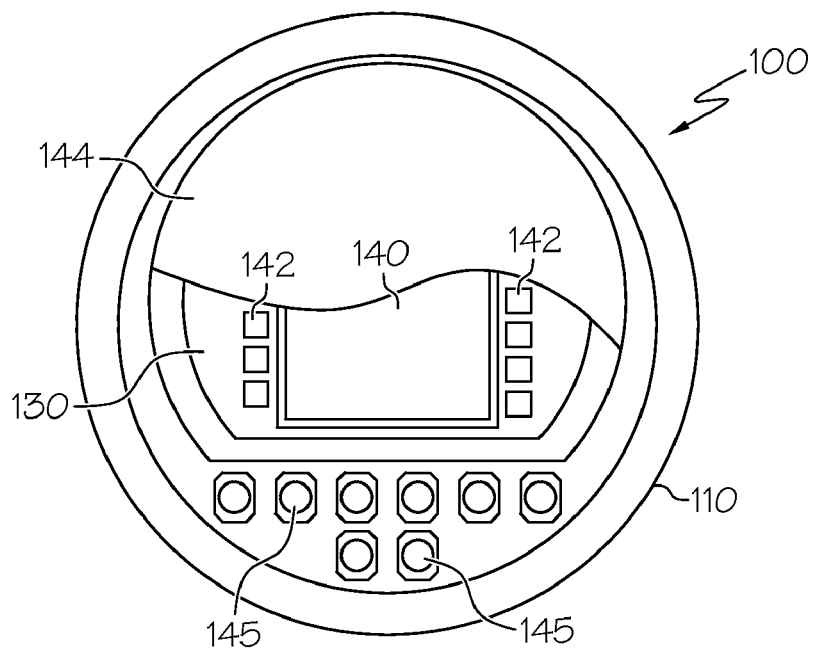
FIG. 1B illustrates a top sectional view of the pressure sensing device of FIG. 1A.

A pressure sensor die 140 is attached to an upper surface of pedestal 131 and is electrically connected to substrate 130 such as by being wire-bonded to a plurality of bonding pads 142 on substrate 130, such as shown in FIG. 1B. In one embodiment, sensor die 140 is a piezo resistive silicon pressure sensing die with an on-die temperature measurement function. The sensor die 140 can be affixed to pedestal 131 using a silicon to silicon diffusion bond, a silicon to silicon braze bond, or a silicon to ceramic thermo-electric bond. The pedestal 131 provides strain isolation between support structure 110 and sensor die 140.

A hermetic sealing cover 144 is affixed to substrate 130 over sensor die 140 to create a reference pressure within the space defined by cover 144 and substrate 130 for sensor die 140. The cover 144 can contain a 'getter' material, which continuously removes out-gassed molecules over time. Exemplary getter materials include barium, calcium, sodium, strontium, cesium, or phosphorus.

In one embodiment, substrate 130 has brazing pads to which support structure 110 and cover 144 are brazed. The bonding pads 142 connect through middle layers of substrate 130 to contact pads or pins outside the reference pressure that are connected to electrical lead wires 145.

Figure 1C:
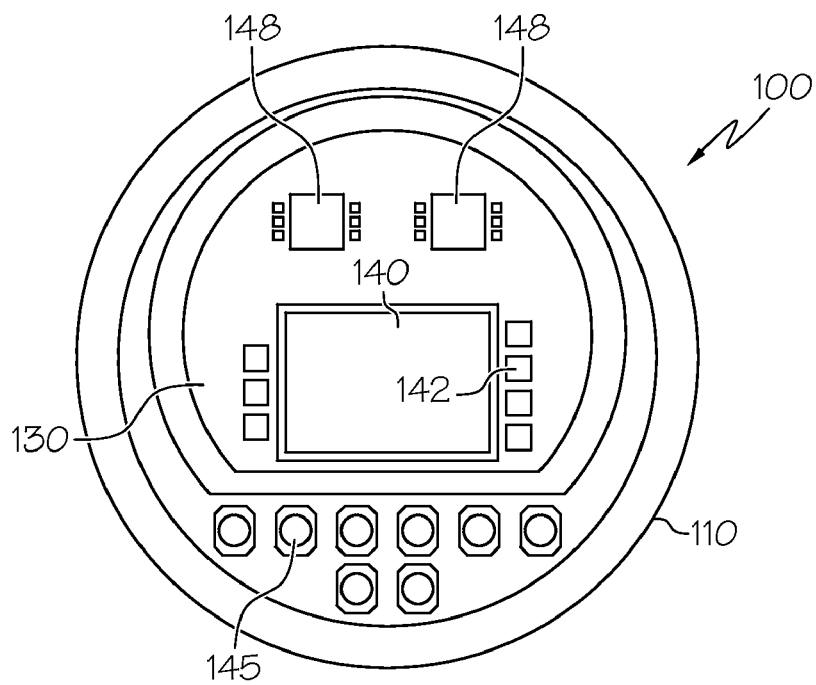
FIG. 1C illustrates a top sectional view of the pressure sensing device of FIG. 1A according to an alternative embodiment.

In an alternative embodiment, one or more additional integrated circuit dies 148 can be mounted on substrate 130 along with sensor die 140 in the reference pressure, such as shown in FIG. 1C. The integrated circuit dies 148 can include high temperature integrated circuit dies, conditioning circuit dies, operational amplifiers, passive components, and the like, or various combinations thereof. These additional die components can provide various functionalities such as pressure output characterization, output signal conditioning, and the like.

A media isolation component 150 is secured to bottom flange 120. The media isolation component 150 can be a convoluted diaphragm or a bellows, and can be composed of a Ni—Cr alloy such as an Inconel alloy. The sensor die 140 is connected by tubes 133 and 134 to a chamber 152 of media isolation component 150 that is filled with a fluid such as oil or perfloro-poly-ether. The fluid transmits the pressure applied to media isolation component 150 to sensor die 140. The fluid can enter chamber 152 through a fluid fill port 154 in lower section 114 of support structure 110.

In one implementation, media isolation component 150 such as a bellows can have a 100 psi preload of a fluid. Pressure containment and preload can be achieved by providing a thick end cap 153 on media isolation component 150 such as a bellows. If the tubing or die fail and leak pressure, the end cap 153 valves off capillary tube 134, preventing pressure build up downstream inside a tool using sensing device 100.

The construction of sensing device 100 minimizes deep penetration welds in that only one deep penetration weld is required, which can be a low cost laser weld. In prior conventional sensor designs, e-beam welding is required, which can only be done in a vacuum, making the sensors much more costly. In addition, the present sensing device has lower production costs by elimination of the header, and by achieving the reference pressure through performing the sealing brazing in an inert atmosphere or vacuum oven in one operation.

Figure 2:
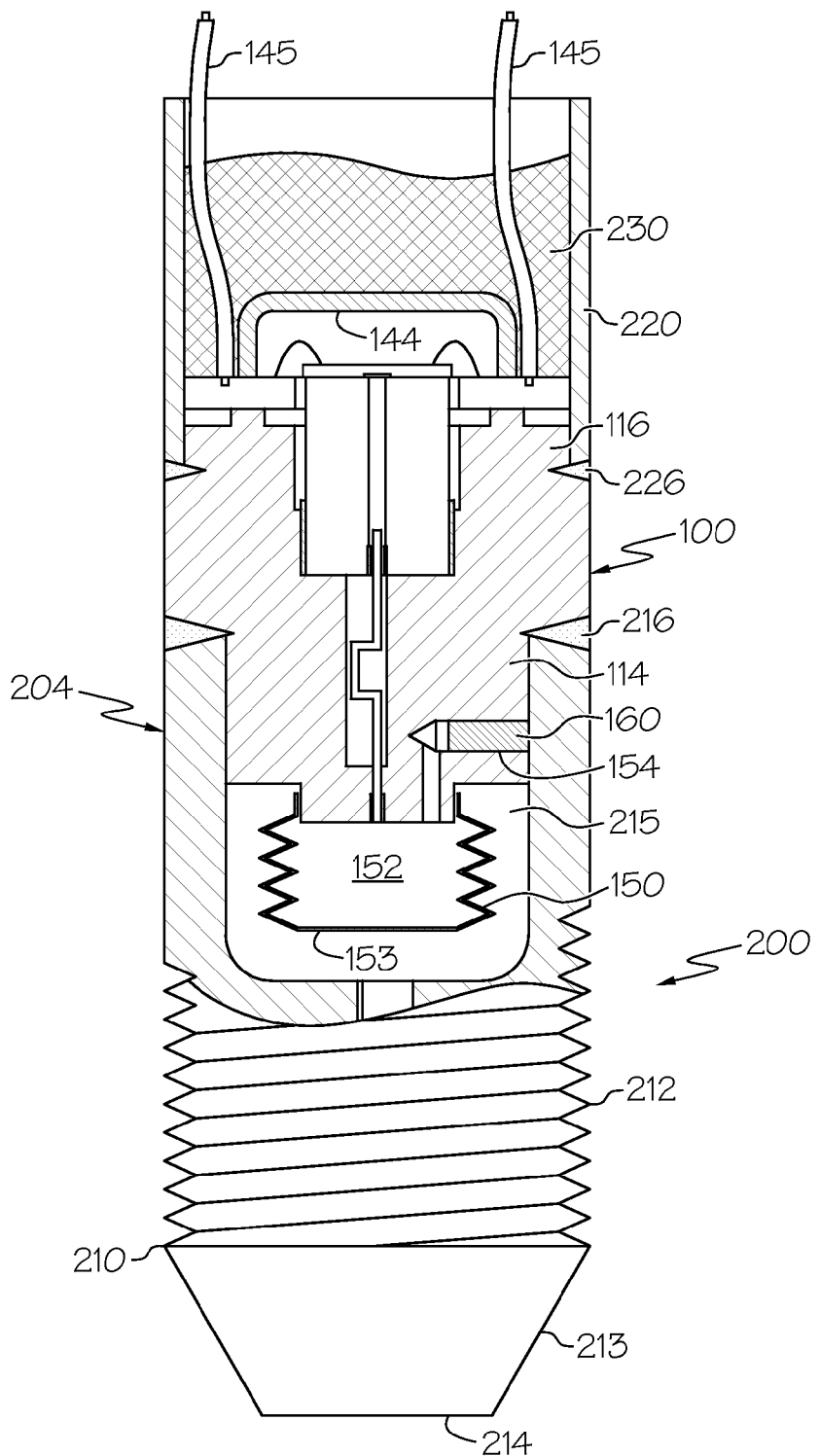
FIG. 2 illustrates a cross-sectional side view of a pressure sensing apparatus that includes the pressure sensing device of FIG. 1A mounted in a high pressure fitting.

FIG. 2 illustrates a pressure sensing apparatus 200 that includes the pressure sensing device 100 mounted in a high pressure fitting 204 according to one embodiment. The fitting 204 includes a front head portion 210 at one end with a plurality of outer threads 212 along a portion thereof. The head portion 210 has a conical surface 213 that extends from outer threads 212 and narrows to a tip 214. The head portion 210 also defines a cavity 215 into which is inserted lower section 114 of sensing device 100.

A fluid fill port plug 160 is used to seal fluid fill port 154 prior to inserting lower section 114 into cavity 215. The fluid fill port plug 160 is isostatically balanced, which allows for a light weld sealing. The lower section 114 fits snugly against the inner wall of cavity 215, and media isolation component 150 extends into an open portion of cavity 215. A weld 216 secures lower section 114 within cavity 215 of head portion 210. The end cap 153 prevents media isolation component 150 from bottoming out in cavity 215 during operation.

The fitting 204 also has a rear potting shell 220 at an opposite end from head portion 210. The shell 220 fits over top portion 116 of sensing device 100. A weld 226 secures shell 220 around top portion 116. The shell 220 contains a potting material 230 that protects electrical lead wires 145.

During operation of sensing apparatus 200, pressure media (e.g., mud, oil, water, and/or fines from drilling) in cavity 215 of fitting 204 is isostatically balanced with the fluid in chamber 152 of media isolation component 150. The pressure media may be at both high temperature and high pressure. The sensing apparatus 200 provides a sealing mechanism to an external pressure source, and a way to connect end user pressure to sensing device 100. The sealing is accomplished by conical surface 213 of head portion 210 mating with a corresponding female conical surface supplied by an end user that differs in cone angle by about 1 degree.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A pressure sensing device, comprising:
a substrate having an opening;
a pressure sensor die electrically connected to the substrate;
a pedestal having an upper surface that extends through the opening in the substrate, the upper surface of the pedestal affixed to the pressure sensor die, the pedestal having a pressure port that extends from the upper surface to a bottom surface of the pedestal, the pressure port containing a hermetic sealing tube therein;
a hermetic sealing cover affixed to the substrate over the pressure sensor die, the hermetic sealing cover and the substrate configured to contain a reference pressure for the pressure sensor die;
a media isolation component having a chamber filled with a fluid that transmits a pressure applied to the media isolation component to the pressure sensor die;
a pressure connector capillary tube affixed within the pressure port of the pedestal and in communication with the sealing tube, the capillary tube and the sealing tube providing fluid communication between the chamber of the media isolation component and the pressure sensor die;
wherein the substrate has electrical connections outside of the reference pressure that electrically connect to the pressure sensor die.

2. The device of claim 1, wherein the substrate comprises a ceramic multilayer substrate with interlayer electrical connects.

3. The device of claim 1, wherein the pressure sensor die is electrically connected to the substrate by wire-bonding to a plurality of bonding pads on the substrate in the reference pressure.

4. The device of claim 1, wherein the pressure sensor die comprises a piezo resistive silicon pressure sensing die with an on-die temperature measurement function.

5. The device of claim 4, wherein the pedestal comprises a silicon strain isolating pedestal or a ceramic strain isolating pedestal.

6. The device of claim 5, wherein the upper surface of the pedestal is affixed to the pressure sensor die with a silicon to silicon diffusion bond, a silicon to silicon braze bond, or a silicon to ceramic thermo electric bond.

7. The device of claim 1, wherein the hermetic sealing cover includes a getter material and is affixed to the substrate with a braze.

8. The device of claim 1, wherein the media isolation component comprises a bellows or a convoluted diaphragm.

9. The device of claim 1, wherein the fluid comprises oil or perfloro-poly-ether.

10. The device of claim 1, further comprising a fluid fill port in communication with the chamber in the media isolation component.

11. The device of claim 1, wherein the pressure connector capillary tube comprises a nickel-cobalt ferrous alloy.

12. The device of claim 1, wherein the pressure connector capillary tube has a strain-relief section.

13. The device of claim 1, further comprising one or more high temperature integrated circuit dies, conditioning circuit dies, operational amplifiers, passive components, or combinations thereof, which are mounted on the substrate in the reference pressure.

14. The device of claim 1, further comprising a support structure for the substrate and the pedestal.

15. The device of claim 14, wherein the support structure comprises:
an upper section with a first outer diameter, the upper section including a top portion with an outer support ring;
a lower section with a second outer diameter that is smaller than the first outer diameter, the lower section including a bottom flange; and
a channel within the support structure, the channel having an upper channel portion that extends partially through the upper section, and a lower channel portion that is contiguous with the upper channel portion and extends through the lower section, wherein the upper channel portion has a diameter that is larger than a diameter of the lower channel portion.

16. The device of claim 15, wherein the substrate is attached to the outer support ring by a braze.

17. The device of claim 15, wherein the pedestal is secured within the upper channel portion by a braze or an epoxy, the pedestal providing strain isolation between the support structure and the sensor die.

18. The device of claim 15, wherein the pressure connector capillary tube extends through the lower channel portion, and is affixed within the pressure port of the pedestal by a braze or weld.

19. The device of claim 15, wherein the support structure and the media isolation component comprise a nickel-chromium alloy.

20. An apparatus for sensing pressure in harsh environments, the apparatus comprising:
   a fitting comprising:
      a front head portion defining a cavity; and
      a rear shell containing a potting material; and
   a pressure sensing device secured within the fitting, the pressure sensing device comprising:
      a substrate having an opening, the substrate disposed in the rear shell of the fitting;
      a pressure sensor die electrically connected to the substrate;
      a pedestal having an upper surface that extends through the opening in the substrate, the upper surface of the pedestal affixed to the pressure sensor die, the pedestal having a pressure port that extends from the upper surface to a bottom surface of the pedestal, the pressure port containing a hermetic sealing tube therein;
      a hermetic sealing cover affixed to the substrate over the pressure sensor die, the hermetic sealing cover and the substrate configured to contain a reference pressure for the pressure sensor die;
      a media isolation component having a chamber filled with a fluid that transmits a pressure applied to the media isolation component to the pressure sensor die, the media isolation component extending within the cavity of the front head portion of the fitting; and
      a pressure connector capillary tube affixed within the pressure port of the pedestal and in communication with the sealing tube, the capillary tube and the sealing tube providing fluid communication between the chamber of the media isolation component and the pressure sensor die;
   wherein the substrate has electrical connections outside of the reference pressure that electrically connect the pressure sensor die to electrical lead wires extending through the rear shell of the fitting.

* * * * *